US 6,674,657 B2

(12) United States Patent
Nagaya et al.

(10) Patent No.: US 6,674,657 B2
(45) Date of Patent: Jan. 6, 2004

(54) OVERVOLTAGE-PROTECTIVE DEVICE FOR POWER SYSTEM, AC/DC CONVERTER AND DC/DC CONVERTER CONSTITUTING THE POWER SYSTEM

(75) Inventors: Yoshihiro Nagaya, Kasugai (JP); Kyuichi Takimoto, Kasugai (JP); Toshiyuki Matsuyama, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/041,594

(22) Filed: Jan. 10, 2002

(65) Prior Publication Data

US 2002/0122323 A1 Sep. 5, 2002

(30) Foreign Application Priority Data

Mar. 5, 2001 (JP) ........................................ 2001-059681

(51) Int. Cl.[7] ................................................. H02H 7/10
(52) U.S. Cl. ......................... 363/50; 363/53; 323/284; 323/351; 361/18; 361/91.1
(58) Field of Search ................................ 323/223, 224, 323/225, 282, 284, 285, 351; 361/18, 56, 79, 86, 90, 91.1–91.8; 363/50, 52, 53

(56) References Cited

U.S. PATENT DOCUMENTS

| 3,908,159 | A | * | 9/1975 | Griffey ........................ 363/54 |
| 5,912,552 | A | * | 6/1999 | Tateishi ........................ 323/285 |
| 6,028,755 | A | * | 2/2000 | Saeki et al. ................ 361/91.1 |
| 6,046,896 | A | | 4/2000 | Saeki et al. |
| 6,069,811 | A | * | 5/2000 | Moriguchi et al. ......... 363/142 |
| 6,487,059 | B2 | * | 11/2002 | Bontempo et al. ............ 361/90 |

FOREIGN PATENT DOCUMENTS

| EP | 0 915 560 A2 | 5/1999 |
| JP | 06-311739 | 11/1994 |
| JP | 10-178779 | 6/1998 |

OTHER PUBLICATIONS

English Language Abstract of European Patent No. EP 0 987 806 A2 (Mar. 22, 2000).
English Language Abstract of European Patent No. EP 0 445 501 A1 (Sep. 11, 1991).
English Language Abstract of German Patent No. DE 35 25 942 A1 (Jan. 29, 1987).
Patent Abstracts of Japan, vol. 1998, No. 11, Sep. 30, 1998 & JP 10 178779, Jun. 30, 1998.
Patent Abstracts of Japan, vol. 1995, No. 2, Mar. 31, 1995 & JP 06 311739 A, Nov. 4, 1994.

* cited by examiner

Primary Examiner—Michael Sherry
Assistant Examiner—Gary L. Laxton
(74) Attorney, Agent, or Firm—Arent Fox Kintner Plotkin & Kahn, PLLC

(57) ABSTRACT

There is intended to provide an overvoltage-protective device capable of protecting a power system from overvoltage not destructively without using a fuse. An alarm signal from an MOS transistor Tr3, a structural element of a DC/DC converter 21, is inputted to a switching circuit 55, a structural element of the AC/DC converter 11. In case an alarm signal keeps high-level potential without indicating overvoltage-state, the switching circuit 55 connects a output current detecting circuit 53 having the smaller gain G1 to an output voltage detecting circuit 50 as well as a feedback circuit 51A, thereby to set large output-power-supply capability. In case an alarm signal inverses to low-level potential indicating overvoltage-state, the switching circuit 55 connects a output current detecting circuit 54 having the larger gain G2 to the output voltage detecting circuit 50 as well as the feedback circuit 51A, thereby to set small output-power-supply capability. Thus, overvoltage at the DC/DC converter 21 can be avoided.

17 Claims, 5 Drawing Sheets

CIRCUIT DIAGRAM DIRECTED TO FIRST EMBODIMENT

CIRCUIT DIAGRAM DIRECTED TO FIRST EMBODIMENT

OUTPUT CHARACTERISTICS OF AC/DC CONVERTER

FIG.4 CIRCUIT DIAGRAM DIRECTED TO SECOND EMBODIMENT

CIRCUIT DIAGRAM OF PRIOR ART

OVERVOLTAGE-PROTECTIVE DEVICE FOR POWER SYSTEM, AC/DC CONVERTER AND DC/DC CONVERTER CONSTITUTING THE POWER SYSTEM

BACKGROUND OF THE INVENTION

1. Field of the Invention

The present invention relates to an overvoltage-protective device for a power system that uses a DC/DC converter. More particularly, it relates to an overvoltage-protective device for power system wherein direct current (DC) power converted from alternate current (AC) power is used as input power of a DC/DC converter.

2. Description of Related Art

For power system used for various electric appliances of recent years such as desk-top type personal computers, computer game appliances and the like, there has been proposed an overvoltage-protective device that sets input power of a DC/DC converter overload-state and melts a fuse disposed on a current path of the input power with heat so as to stop supplying input power when direct current (DC) power is in an overvoltage-state. This is intended to secure safety of appliances.

FIG. 5 shows a circuit diagram of an overvoltage-protective device for a power system 100 directed to prior art. For various electric appliances of recent years such as desk-top type personal computers, computer game appliances and the like, for example, commercial alternate current (AC) power (for example, 100 V, not shown) is inputted to an AC/DC converter 110 as input power, converted into direct current (DC) power VIN, outputted therefrom as output power, and finally inputted to a DC/DC converter 120 through a fuse 130 as output power.

The DC/DC converter 120 is a drop-voltage type converter constituted by circuits of synchronous rectifying system. That is, an MOS transistor Tr1 as a main-side switching element and an MOS transistor Tr2 as a synchronous-side switching element are switched alternately, thereby to control output power VO to a predetermined voltage VO.

A drain terminal and a source terminal of the MOS transistor Tr1 are connected to output power VIN for the AC/DC converter 110 and a drain terminal of the MOS transistor Tr2, respectively, whereby a node VS is constituted. Furthermore, a source terminal of the MOS transistor Tr2 is connected to a ground potential. The node VS is connected to the output power VO through a coil L1 and as well as connected to a cathode terminal of a diode D1 whose anode terminal is connected to a ground potential so as to supply the output power VO flyback current derived from back electromotive force of the coil L1 from the ground potential. A capacitor C1 for voltage smoothing is connected to the output power VO.

From a control circuit 31, output signals OUT1 and OUT2 are outputted to gate terminals of the MOS transistors Tr1 and Tr2, respectively. In normal use, switching of the output signals OUT1 and OUT2 are made alternately based on terminal voltage of the output power VO detected by the control circuit 31, thereby to control output voltage to a predetermined voltage value. Furthermore, the output voltage VO is detected by an overvoltage detecting circuit 132. Detecting overvoltage state wherein output voltage VO exceeds the predetermined voltage value, the overvoltage detecting circuit 132 outputs an overvoltage detection signal to the control circuit 31. Upon receipt of the overvoltage detection signal, so as to lower voltage value of the output power VO, the control circuit 31 makes a control signal OUT1 low level to set the MOS transistor Tr1 OFF-state whereas makes a control signal OUT2 high level to set the MOS transistor Tr2 ON-state. Thereby, a current path coming from an input power VIN for the output power VO is cut off and at the same time, the output voltage VO is lowered by connecting the output power VO to a ground potential via the coil L1. There is thus constituted an overvoltage-protective device that is to avoid applying overvoltage to electric devices such as CPU.

Let us take a case that a line between the drain terminal and the source terminal of the MOS transistor Tr1 is short-circuited due to failure of the MOS transistor Tr1 or the like, which leads the output power VO to an overvoltage-state. In this case, a control signal OUT1 cannot control the MOS transistor Tr1. As a result, the input power VIN and the output power VO are directly connected through the coil L1, whereby the overvoltage detecting circuit 132 detects overvoltage-state at the control circuit 31. Then, a control signal OUT2 in high level is outputted to keep the MOS transistor Tr2 ON-state. That is, there is formed a low-resistance current path running through a ground potential from the input power VIN via the MOS transistor Tr1 destroyed by short-circuiting to the MOS transistor Tr2 that is conductive, and large amount of current flows in the current path. The large amount of current melts the fuse 130 on the current path with heat, whereby the current path is cut off and the DC/DC converter is separated from the output power VIM for the AC/DC converter to stop supplying input power VIM from there. The system of the above prevents electric devices such as CPU from being destroyed.

Furthermore, an under voltage lockout circuit 33 detects the input power VIN for the DC/DC converter. In case that voltage of the input power VIN lowers the predetermined voltage value, the under voltage lockout circuit 33 sets control signals OUT1 and OUT2 low-level so as to make the MOS transistor Tr1 and Tr2 OFF-state, thereby to prevent the DC/DC converter from operating in error during low input voltage period. In case the fuse 130 is melted with heat, supply of input power VIN to the DC/DC converter is stopped. Accordingly, the under voltage lockout circuit 33 sets the MOS transistors Tr1 and Tr2 OFF-state to let the DC/DC converter stop operating.

However, in the overvoltage-protective device for the power system 100 directed to FIG. 5, the fuse 130 must be inserted on the current path running between the AC/DC converter 110 and the DC/DC converter 120 as an overvoltage-protective device for protecting the output power VO from being destructed due to short-circuiting at the drain terminal and the source terminal of the MOS transistor Tr1. As a result, the number of components increases and so does cost for components whereby, price-down of power system cannot be achieved. Furthermore, a mounting region for the fuse 130 must be taken, and necessity to replace a fuse 130 with new one, in case the fuse 130 is destroyed due to overvoltage-protective operation, must be assumed. Thus, mounting condition is significantly limited. Still further, protecting operation against overvoltage accompanies heat to melt the fuse 130 and the heat does harm to the mounting substrate.

SUMMARY OF THE INVENTION

The present invention is intended to solve the foregoing prior art deficiency. Its prime object is to provide an overvoltage-protective device capable of protecting a power system from overvoltage not destructively without using a fuse.

In order to achieve the above objective, the overvoltage-protective device for a power system based on one aspect of this invention including an AC/DC converter and a DC/DC converter to which output power of the AC/DC converter is inputted as its input power comprises: an overvoltage detecting circuit for detecting overvoltage state of output power of the DC/DC converter; an alarm circuit for outputting an alarm signal as a detection result obtained by the overvoltage detecting circuit; and a change circuit for changing output-power characteristics of the AC/DC converter based on an alarm signal.

In the inventive overvoltage-protective device for a power system, when the overvoltage detecting circuit detects that the output power of the DC/DC converter turns into overvoltage-state, the alarm circuit outputs an alarm signal. Then, the change circuit changes output-power characteristics of the AC/DC converter based on the alarm signal.

By changing output-power characteristics of the AC/DC converter based on an alarm signal that indicates the overvoltage detecting circuit has detected an overvoltage-state, output-power capability of the AC/DC converter can be limited to the extent that the output power for the DC/DC converter cannot keep overvoltage-state. As a result, there can be avoided overvoltage-state at the output power for the DC/DC converter. Accordingly, it is not necessary to insert a fuse on a current path that connects an output of the AC/DC converter and an input of the DC/DC converter. Thereby, there can be obtained merits as follows: (1) costs for components are reduced; (2) mounting regions for a fuse and the like are not required; and (3) limitations of mountings (replacement of fuses, damages to components caused by heat generated while melting a fuse, and the like) are cleared. That is, an overvoltage-protective device for power system can be realized for sure with low cost and simple structure.

The above and further objects and novel features of the invention will more fully appear from following detailed description when the same is read in connection with the accompanying drawings. It is to be expressly understood, however, that the drawings are for the purpose of illustration only and not intended as a definition of the limits of the invention.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A preferred embodiment of the inventive overvoltage-protective device for a power system, and an AC/DC converter and a DC/DC converter constituting the power system will be explained in detail with reference to FIG. 1 through FIG. 4.

Figure 1:
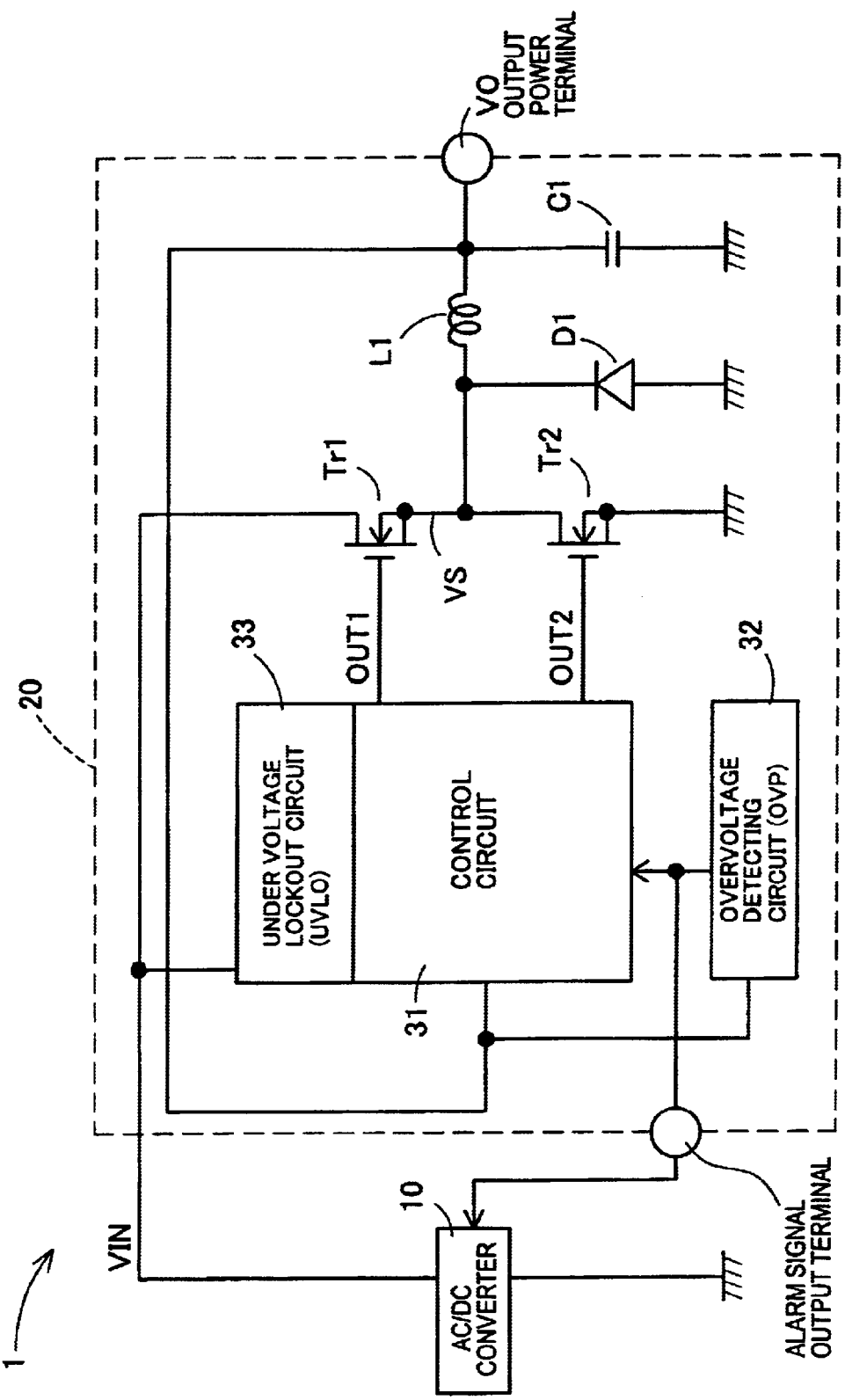
FIG. 1 is a principle diagram of an overvoltage-protective device for a power system directed to the present invention.
Figure 5:
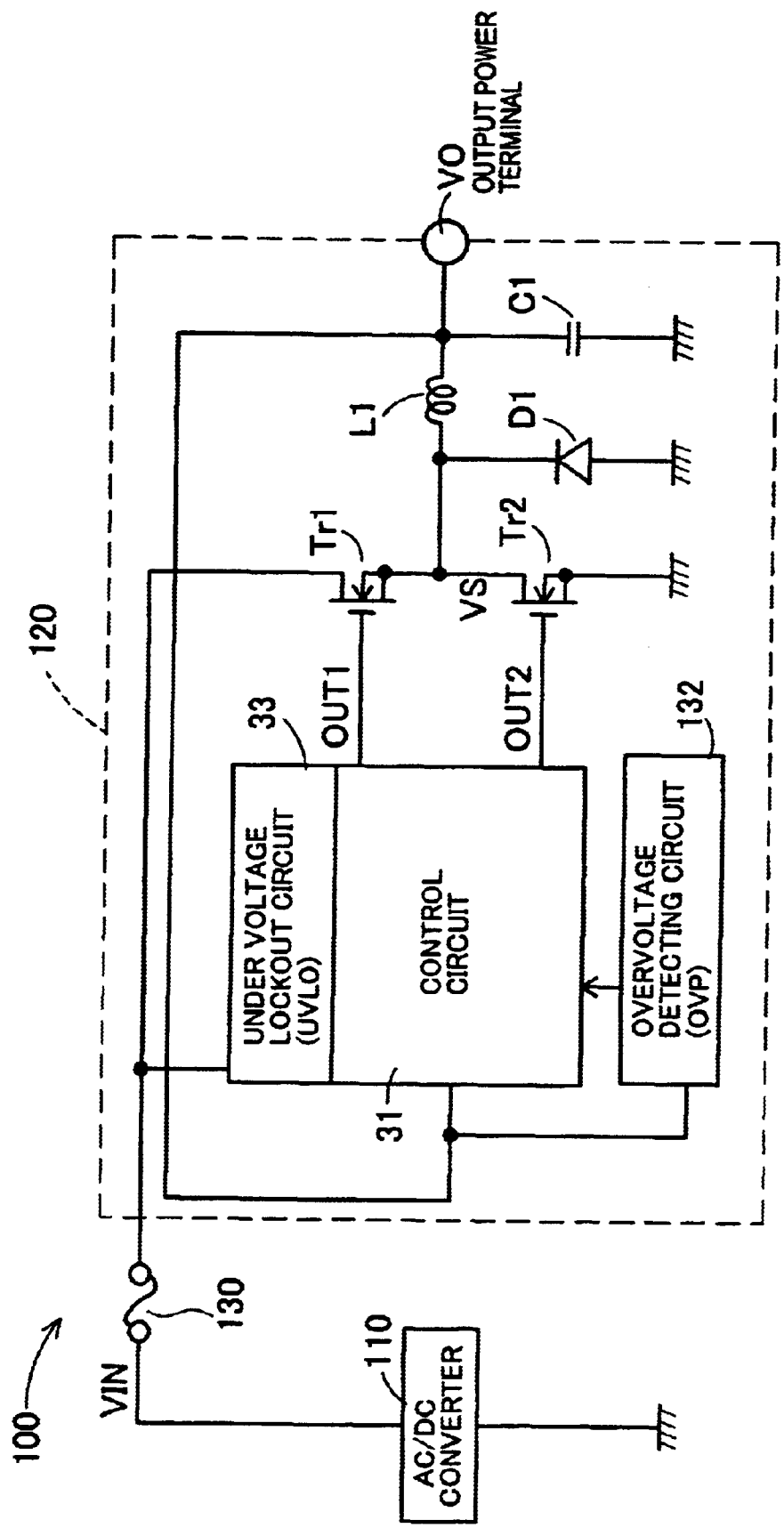
FIG. 5 is a circuit diagram of an overvoltage-protective device for a power system directed to prior art.

FIG. 1 is a principle diagram of an overvoltage-protective device for a power system 1 directed to the present invention. Similar to the overvoltage-protective device for the power system 100 of prior art directed to FIG. 5, in the power system 1, a commercial alternate current (AC) power (100V, for example, not shown) is inputted to an AC/DC converter 10 then, converted into direct current (DC) power VIN, and finally inputted to a DC/DC converter 20 to obtain an output power VO. Out of component elements for the power system 1 directed to FIG. 1, the elements to which numeral or notation same as in the power supply system 100 is assigned are identical to those in the power supply system 100 in terms of structure, operational mechanism and effect. More specifically, in a DC/DC converter 20, a control circuit 31, an under voltage lockout circuit 33, an MOS transistor Tr1 as main-side switching element and an MOS transistor Tr2 as synchronous-side switching element wherein synchronous rectifying system is adopted, a coil L1, a diode D1 and a capacitor C1 for voltage smoothing are identical to those in the power system 100 directed to the prior art.

Component elements different from those in the prior art are an AC/DC converter 10, and an overvoltage detecting circuit 32 in the DC/DC converter 20. That is, when the overvoltage detecting circuit 32 for detecting output power VO of the DC/DC converter 20 detects overvoltage state due to short-circuiting or the like in the MOS transistor Tr1, the overvoltage detecting circuit 32 outputs an overvoltage detecting signal to the control circuit 31 to set the MOS transistor Tr2 ON-state, similar to case of the prior art. Furthermore, in the present invention, an alarm signal based on overvoltage detection is outputted to the external from the DC/DC converter 20. The alarm signal outputted from the DC/DC converter 20 is received by the AC/DC converter 10 and then, output-power characteristics of the output power VIN for the AC/DC converter 10 is changed. To be more specific, power-supply capability of the output power VIN is lowered then. Accordingly, the output power VIN for the AC/DC converter 10 short-circuited to a ground potential via the MOS transistor Tr2 made ON-state based on overvoltage detection by the MOS transistor Tr1 in short-circuited state cannot supply short-circuit current. Therefore, voltage of the output power VIN lowers. When the lowered voltage value is set to operation voltage of the under voltage lockout circuit 33 for the DC/DC converter 20, the DC/DC converter 20 stops operating. Accordingly, operation to protect the power system from overvoltage can be conducted without arranging a fuse on a current path that runs between the output power VIN for the AC/DC converter 10 and the DC/DC converter 20.

After the DC/DC converter 20 stops operating, the DC/DC converter 20 can resume normal operation if overvoltage-state at the output power VO for the DC/DC counter 20 has shifted to normal. Otherwise the overvoltage-protective state is maintained and same circuit operation is repeated to keep the overvoltage-protective state.

Figure 2:
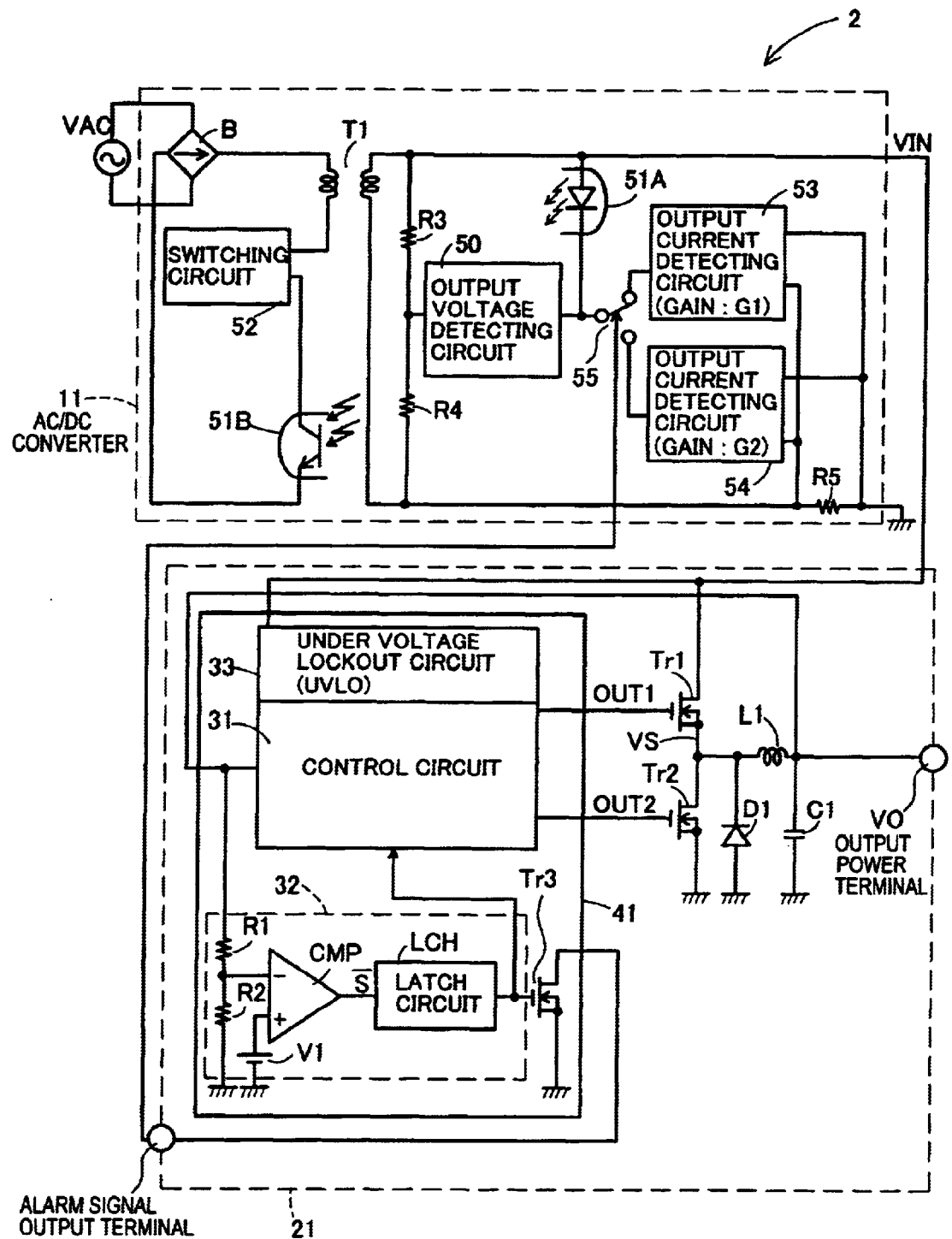
FIG. 2 is a circuit block diagram of an overvoltage-protective device for a power system directed to a First Example in the First Embodiment.
Figure 3:
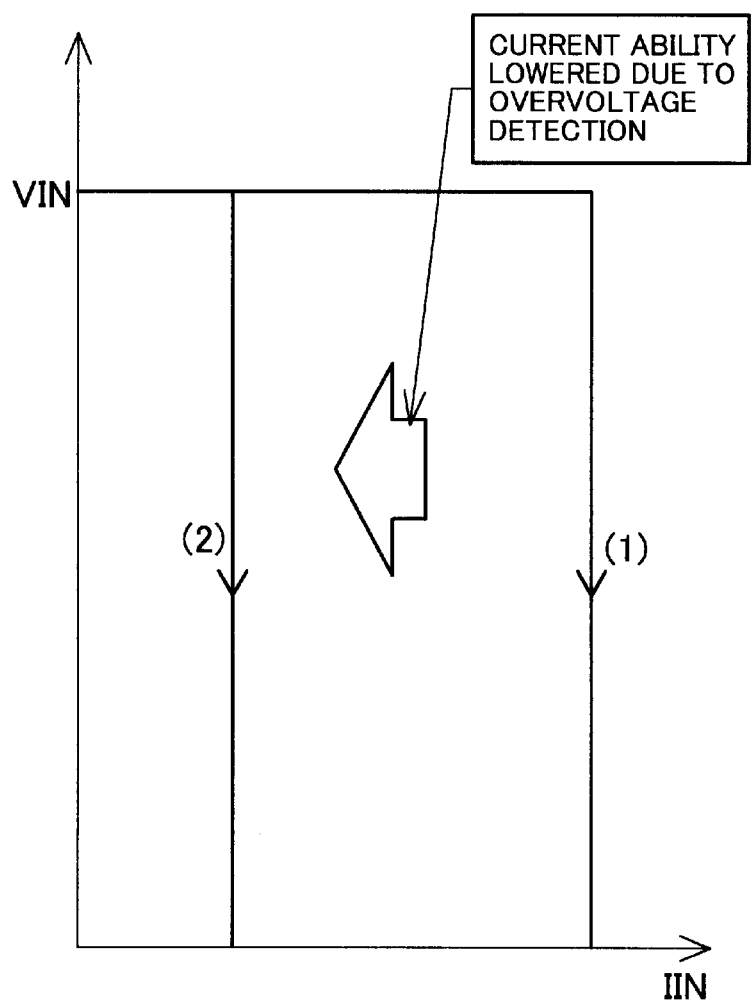
FIG. 3 is a diagram showing output characteristics of an AC/DC converter directed to the First and Second Examples.
Figure 4:
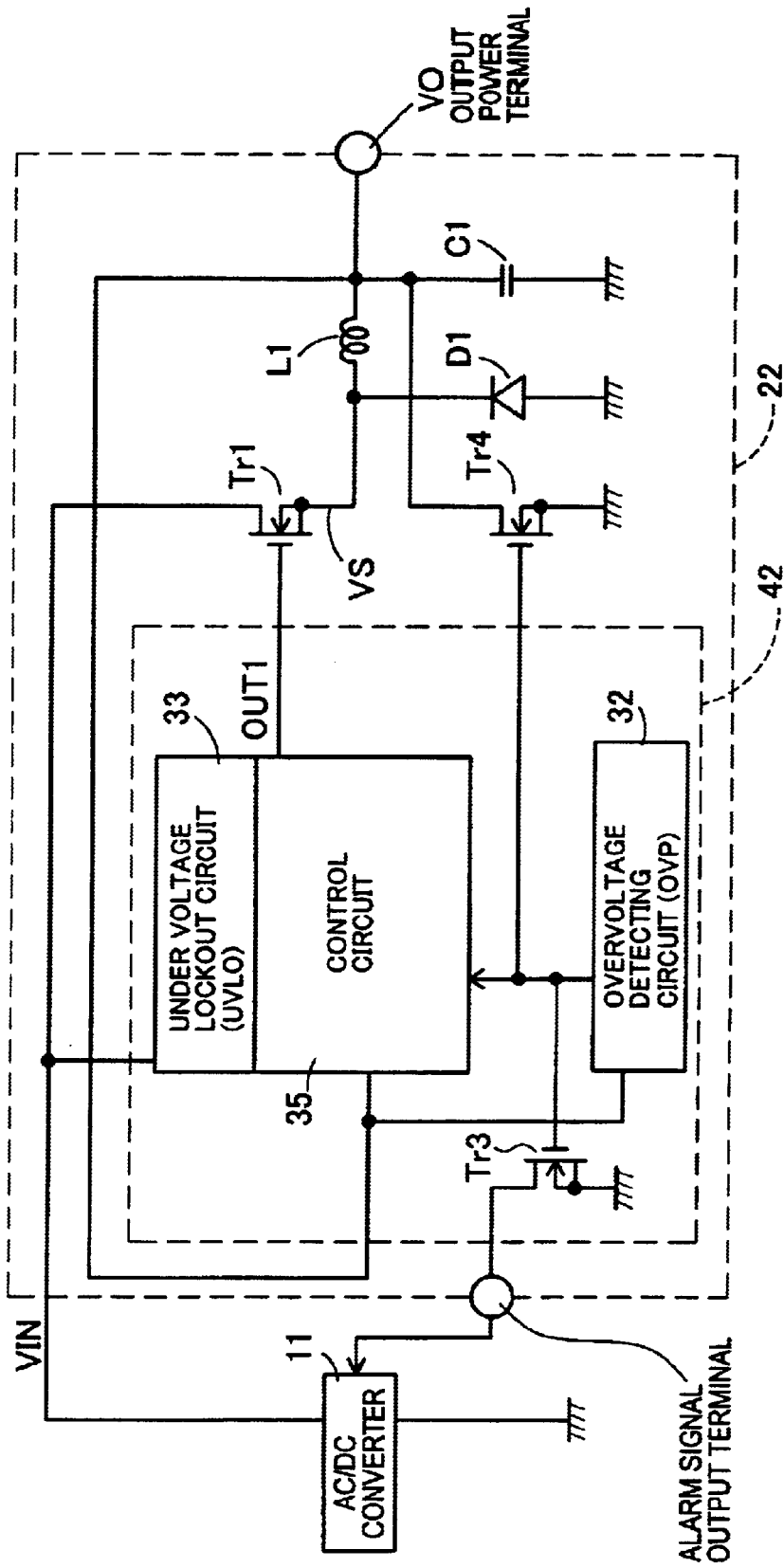
FIG. 4 is a circuit diagram of an overvoltage-protective device for a power system directed to a Second Example in the First Embodiment.

FIG. 2 shows the overvoltage-protective device for a power system directed to a First Example. FIG. 3 shows output characteristics of an AC/DC converter directed to the First Example and a Second Example. FIG. 4 shows an overvoltage-protective device for power system directed to the Second Example.

FIG. 2 shows the overvoltage-protective device for a power system 2 directed to the First Example. As to component elements similar to those of the of the prior art, same numerals or notations are assigned thereto. Since they work similarly, description of them will be omitted. The power system 2 is constituted by an AC/DC converter 11 and a DC/DC converter 21.

The AC/DC converter 11 switches outputs from a bridge circuit B using a switching circuit 52, wherein the bridge circuit B receives alternate power VAC and the switching circuit 52 is controlled by a feedback circuit 51B that controls voltage of output power VIN for a photo-coupler or the like. An output from the bridge circuit B is inputted to a primary-side of a trans T1 that converts power from alternate current power VAC to direct current power VIN. An output from a secondary-side of the trans T1 is converted into output power VIN. However potential of the output power VIN is divided by resistances R3 and R4, and then detected by an output voltage detecting circuit 50 so as to obtain a predetermined voltage value of the output power VIN. The detection output from the output voltage detecting circuit 50 is inputted to a feedback circuit 51A for a photo-coupler or the like to feedback the output to the primary-side of the trans T1, whereby the predetermined voltage value of the output power VIN is kept.

There is inserted a detection resistance R5 for detecting an output current value in the current path of the AC/DC converter 11. By detecting end-to-end voltage of the detection resistance R5, an output current value is detected. Thereby output power supply capability is appropriately set. In the AC/DC converter 11, there are connected two couples of output current detecting circuits 53, 54 in parallel. The output current detecting circuit 53 has a gain G1 and the output current detecting circuit 54 has a gain G2. The gains G1 and G2 have relationship, for example, as below:

$$G1<G2$$

Signals outputted from the output current detecting circuits 53, 54 are switched by switching circuit 55 appropriately and then, inputted to the output voltage detecting circuit 50 as well as the feedback circuit 51A. In case an output signal reaches a predetermined output signal determined by output current to be detected and gains, the output current detecting circuits 53, 54 control the output voltage detecting circuit 50 and the feedback circuit 51A so as to restrict power-conversion efficiency of the AC/DC converter 11. Thereby, output power supply capability of the AC/DC converter 11 is determined. That is, when the output current detecting circuit 53 having G1 of the smaller gain is made conductive by the switching circuit 55, an output current value necessary for the output current detecting circuit 53 to reach the predetermined output signal is larger. Accordingly, output power supply capability of the AC/DC converter 11 is enhanced. On the other hand, when the output current detecting circuit 54 having G2 of the larger gain is made conductive by the switching circuit 55, an output current value necessary for the output current detecting circuit 54 to reach the predetermined output signal is smaller. Accordingly, output power supply capability of the AC/DC converter is restrained.

An overvoltage detecting circuit 32 for the DC/DC converter 21 is constituted by voltage-divided resistances R1 and R2 for detecting divided voltage for output power VO, a comparative circuit CMP for comparing the voltage-divided resistances R1 and R2 with a reference voltage V1 and, a latch circuit LCH. When the output power VO turns into overvoltage-state, outputs from the comparative circuit CMP are inversed. Outputs inversed at the comparative circuit CMP are latched by the latch circuit LCH so that the DC/DC converter 21 can keep detecting overvoltage. Outputs from the latch circuit LCH are inputted to the control circuit 31 to set the MOS transistor Tr2 ON-state and let overvoltage at the output source VO escape to ground potential. By making an open-drain-structured MOS transistor Tr3 ON-state, overvoltage-state at the output power VO is alarmed to the external of the DC/DC converter 21. Overvoltage detection state latched by the latch circuit LCH is kept until power supply to the latch circuit LCH is exhausted, i.e., until the under voltage lockout circuit 33 detects lowering of input power VIN to be supplied to the DC/DC converter 21 and the DC/DC converter 21 stops operating. It should be noted that the control circuit 31, the under voltage lockout circuit 33 and the overvoltage detecting circuit 32 constitute a semiconductor integrated circuit 41 for the DC/DC converter 21, in general.

An alarm signal from the MOS transistor Tr3 that is a structural element of the DC/DC converter 21, is inputted to the switching circuit 55 that is a structural elements of the AC/DC converter 11. In case an alarm signal keeps high-level potential without indicating overvoltage-state, the switching circuit 55 connects the output current detecting circuit 53 having the smaller gain G1 to the output voltage detecting circuit 50 and the feedback circuit 51A, thereby to set output power supply capability to high. In case an alarm signal inverses to low-level potential indicating overvoltage-state, the switching circuit 55 connects the output current detecting circuit 54 having the larger gain G2 to the output voltage detecting circuit 50 and the feedback circuit 51A, thereby to set output power supply capability to low.

FIG. 3 shows output characteristics of the AC/DC converter 11. (1) shows output characteristics in case of large output power supply capability, wherein an alarm signal keeps high-level potential without indicating overvoltage-state and the output current detecting circuit 53 having the smaller gain G1 is connected to the output voltage detecting circuit 50 and the feedback circuit 51A. (2) shows output characteristics in case of small output power supply capability, wherein an alarm signal inverses to low-level potential indicating overvoltage-state and the output current detecting circuit 54 having the larger gain G2 is connected to the output voltage detecting circuit 50 and the feedback circuit 51A.

In the First Example, the switching circuit 55 changes output power characteristics of the AC/DC converter 11 appropriately based on an alarm signal from the overvoltage detecting circuit 32 that works as overvoltage detecting means so as restrict power capability for the AC/DC converter 11 to the extent that overvoltage-state of the output power VO cannot be maintained. As a result, overvoltage of the output power VO for the DC/DC converter 21 can be avoided and, it is not necessary to insert a fuse on a current path running between from an output of the AC/DC converter 11 to an input of the DC/DC converter 21. Thereby, there can be obtained merits as follows: (1) costs for components are reduced; (2) mounting regions for a fuse and the like are not required; and (3) limitations of mountings (replacement of fuses, damages to components caused by heat generated while melting a fuse, and the like) are cleared. That is, an overvoltage-protective device for the power system 2 can be realized for sure with low cost and simple structure.

Furthermore, in the overvoltage-protective device for the power system 2, the DC/DC converter 21 includes the overvoltage detecting circuit 32, the MOS transistor Tr3 that works as a alarm circuit for outputting detection result as alarm signal, the AC/DC converter 11 includes two pairs of output current detecting circuits 53 and 54 that work as change circuits for changing output power characteristics as well as two pairs of first output-current-supply-capability setting circuit and second output-current-supply-capability setting circuit. The MOS transistor Tr3 delivers an alarm signal to the AC/DC converter 11.

Accordingly, overvoltage at output power VO can be avoided by combining: the DC/DC converter 21 that outputs alarm signals alarming overvoltage detection result; and the AC/DC converter 11 capable of changing output power characteristic by receiving alarm signals.

Furthermore, by appropriately changing output current dropping characteristic, output-current-supply capability of the AC/DC converter can be restricted. More specifically, the output current dropping characteristic can be changed based on a detection result obtained by the overvoltage detecting circuit 32. Thereby, current supply to the DC/DC converter 21 can be restricted to the extent that overvoltage-state at the output power VO cannot be kept. As a result, overvoltage-state at the output power VO can be avoided.

Furthermore, overvoltage-detecting-state in the output power VO for the DC/DC converter 21 can be kept by the latch circuit LCH that latches overvoltage-state. Thereby, overvoltage-protective operation to restrict power capability of the AC/DC converter 11 can be conducted stably so that output power characteristics of the AC/DC converter 11 can be changed in order not to keep overvoltage-state in the output power VO.

Furthermore, the output power VIN for the AC/DC converter 11 can be set lower than a predetermined voltage required as input power VIN for the DC/DC converter 21 by output power characteristics of the AC/DC converter 11, which is changed appropriately. That is, the output power characteristics is changed by the under voltage lockout circuit 33 that works as a low-power-period erroneous-operation avoiding circuit while overvoltage of the output power VO is detected. When it is lower than the predetermined voltage, the under voltage lockout circuit 33 works to stop the DC/DC converter 21, whereby operation of the DC/DC converter 21 stops. When the operation of the DC/DC converter 21 stops, the overvoltage-state in the DC/DC converter 21 is reset. Along with the reset of the overvoltage-state, an alarm signal outputted by the MOS transistor Tr3 is also reset, output power characteristic of the AC/DC converter 11 returns to original state, and the power system returns to normal condition. In case overvoltage-state is not cleared even after returning to normal, the power system can avoid overvoltage-state by repeating the above-described circuit operation.

Still further, the DC/DC converter 21 of this embodiment adopts synchronous rectifying system. Accordingly, output voltage VO for the DC/DC converter 21 can be connected to ground potential by making the MOS transistor Tr2, a synchronous-side switching element, conductive when detecting overvoltage. Thereby, overvoltage-protective operation can be conducted for sure.

In a Second Example shown in FIG. 4, a DC/DC converter 22 adopts asynchronous rectifying system. That is, in the Second Example, there is employed the DC/DC converter 22 that adopts asynchronous rectifying system, instead of the DC/DC converter 21 that adopts synchronous rectifying type. What is different from the First Example is addition of an MOS transistor Tr4 that shunts an output power VO to ground potential when detecting overvoltage of the output power for the DC/DC converter 22. An output of the overvoltage detecting circuit 32 is connected to a gate terminal of the MOS transistor Tr4. Thereby, the MOS transistor Tr4 is set ON-state and the output power VO is shunted to ground potential, which avoids overvoltage-state. Exept the addition of the MOS transistor Tr4, other matters such as structural elements, operational mechanism, and effect of the Second Example are similar to those of the First Example.

The present invention is not confined to the foregoing First and Second Examples, but various modifications and alterations are obviously possible within the scope of the substance of the invention.

For example, the First and Second Examples describe the manner to switch two pairs of the output current detecting circuits 53 and 54 that have different gains so as to protect the power system from overvoltage. However, the present invention is not limited to this manner. An output current detecting circuit may be constituted by a gain variable amplifier or the like wherein gain varies continuously or gradually.

Furthermore, the First and Second Examples describe the manner to change output-power-supply capability characteristic to output current dropping characteristic. However, the present invention is not limited to this manner. Other than dropping characteristic, output current characteristic may be changed to power consumption limiting characteristic or the like.

According to the present invention, there is provided an overvoltage-protective device capable of protecting overvoltage of a power system not destructively without using a fuse.

What is claimed is:

1. An overvoltage-protective device for a power system that has an AC/DC converter and a DC/DC converter to which output power of the AC/DC converter is inputted as its input power comprising:

an overvoltage detecting circuit for detecting overvoltage state of output power of the DC/DC converter;

an alarm circuit for outputting an alarm signal as a detection result obtained by the overvoltage detecting circuit;

a change circuit consisting of a first output-current-supply-capability setting circuit for setting output-power characteristics of the AC/DC converter to first output-current-supply-capability based on the alarm signal and a second output-current-supply-capability setting circuit for setting output-power characteristics of the AC/DC converter to second output-current-supply-capability based on the alarm signal; and a switching circuit for switching connections between the first output-current-supply-capability setting circuit and the second output-current-supply-capability setting circuit.

2. An overvoltage-protective device for a power system according to claim 1, wherein the DC/DC converter comprises the overvoltage detecting circuit and the alarm circuit, and the AC/DC converter comprises the change circuit.

3. An overvoltage-protective device for a power system according to claim 1, wherein, the output-current-supply capability of the AC/DC converter has output-current-dropping characteristic.

4. An overvoltage-protective device for a power system according to claim 1, wherein the overvoltage detecting circuit includes a latch circuit for latching a detection result regarding overvoltage-state.

5. An overvoltage-protective device for a power system according to claim 1, wherein the DC/DC converter includes a switching element that shunts an output power for the DC/DC converter to ground potential when detecting overvoltage of the output power for the DC/DC converter.

6. An overvoltage-protective device for a power system according to claim 1, wherein the DC/DC converter adopts synchronous rectifying system and includes:
   a main-side switching element for connecting input power and output power of the DC/DC converter; and
   a synchronous-side switching element for connecting the output power and ground potential, wherein
      the synchronous-side switching element is set conductive when detecting overvoltage-state of the output power for the DC/DC converter; and
      the main-side switching element and the synchronous-side switching element are set non-conductive when detecting low input power for the DC/DC converter.

7. An overvoltage-protective device for a power system according to claim 6, wherein the synchronous-side switching element includes an MOS transistor.

8. An overvoltage-protective device for a power system according to claim 1 further comprising a low-power-period-erroneous-operation avoiding circuit that stops operation of the DC/DC converter in case the input power supplied to the DC/DC converter lowers a predetermined voltage.

9. An overvoltage-protective device for a power system according to claim 8 wherein the erroneous-operation avoiding circuit is installed in the DC/DC converter.

10. An overvoltage-protective device for a power system according to claim 9, wherein the switching element includes an MOS transistor.

11. A DC/DC converter, to which output power of an AC/DC converter is inputted as its input power, comprising:
   an overvoltage detecting circuit for detecting overvoltage state of output power of the DC/DC converter;
   an alarm circuit for outputting an alarm signal as a detection result obtained by the overvoltage detecting; and
   an alarm signal output terminal for outputting the alarm signal, the alarm signal outputting terminal being connected to the AC/DC converter for setting output-power characteristics of the AC/DC converter.

12. A DC/DC converter according to claim 11 wherein the overvoltage detecting circuit includes a latch circuit for latching a detection result regarding degree of overvoltage-state.

13. A DC/DC converter according to claim 11 further comprising a low-power-period-erroneous-operation avoiding circuit that orders circuits in the DC/DC converter to stop operation in case the input power supplied to the DC/DC converter lowers a predetermined voltage.

14. A DC/DC converter according to claim 11, wherein the DC/DC converter adopts asynchronous rectifying system and includes a switching element that shunts an output power for the DC/DC converter to ground potential when detecting overvoltage of the output power.

15. A DC/DC converter according to claim 11, wherein the DC/DC converter adopts synchronous rectifying system and includes:
   a main-side switching element for connecting input power and output power of the DC/DC converter; and
   a synchronous-side switching element for connecting the output power and ground potential, wherein
      the synchronous-side switching element is set conduntive when detecting overvoltage-state of the output power for the DC/DC converter; and
      the main-side switching element and the synchronous-side switching element are set non-conductive when detecting low-input power for the DC/DC converter.

16. An AC/DC converter that supplies input power to a DC/DC converter comprising:
   a change circuit consisting of a first output-current-supply-capability setting circuit for setting output-power characteristics of the AC/DC converter to first output-current-supply-capability based on a control signal from an external portion and a second output-current-supply-capability setting circuit for setting output-power characteristics of the AC/DC converter to second output-current-supply-capability based on the control signal from the external; and
   a switching circuit for switching connections between the first output-supply-current-capability setting circuit and the second output-current-supply-capability setting circuit.

17. An AC/DC converter according to claim 16, wherein the output-current-supply capability has output-current dropping characteristic.

* * * * *